Figure 4:
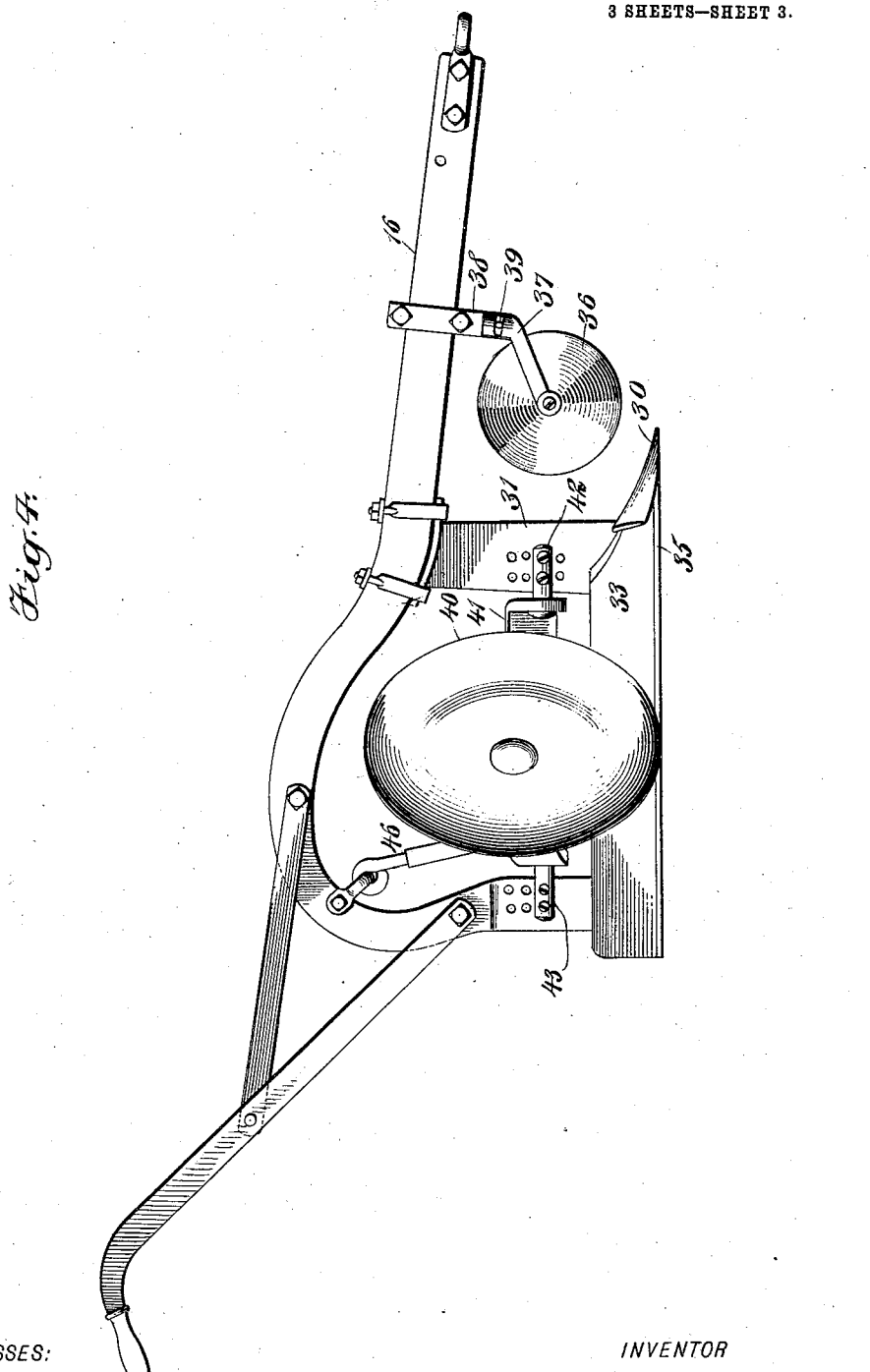

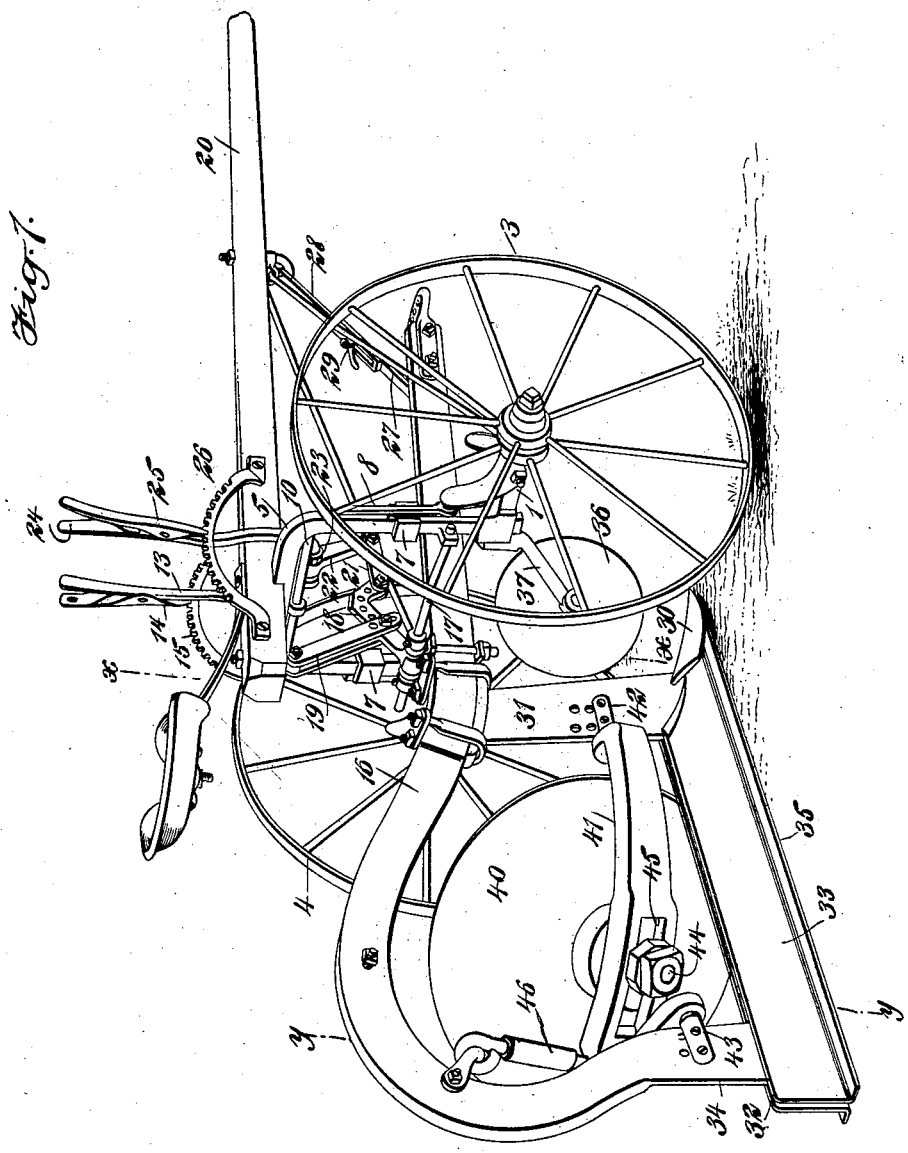

No. 735,506. PATENTED AUG. 4, 1903.
J. N. HATCHER.
PLOW.
APPLICATION FILED OCT. 18, 1902.
NO MODEL. 3 SHEETS—SHEET 2.
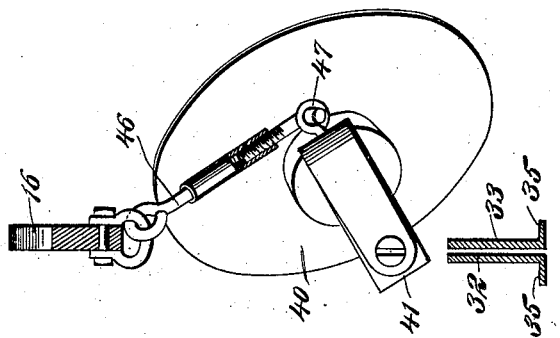
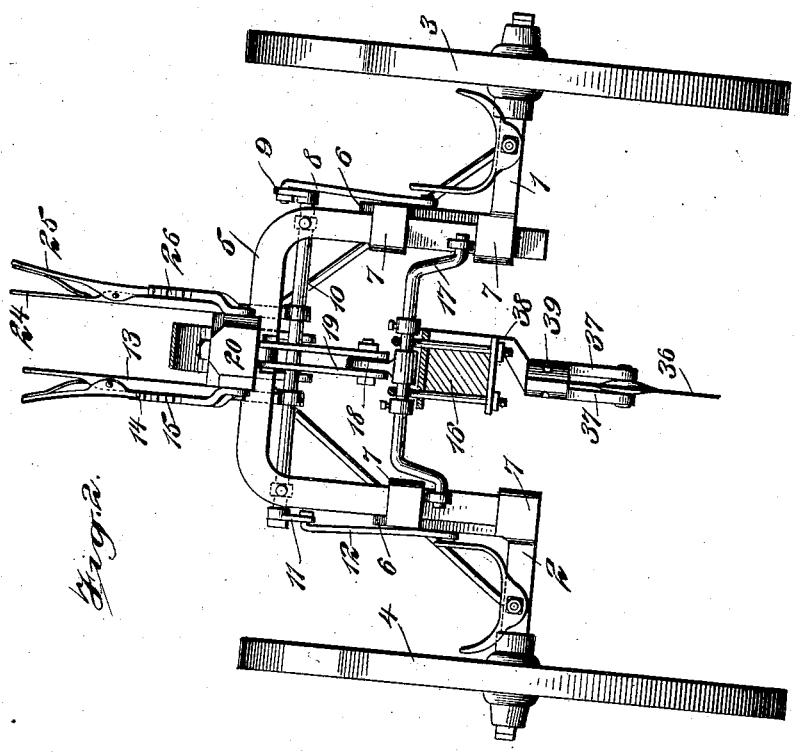
WITNESSES:
INVENTOR
Judson N. Hatcher
BY
ATTORNEYS.

No. 735,506. PATENTED AUG. 4, 1903.
J. N. HATCHER.
PLOW.
APPLICATION FILED OCT. 18, 1902.
NO MODEL. 3 SHEETS—SHEET 3.

WITNESSES:
INVENTOR
Judson N. Hatcher
BY
ATTORNEYS.

No. 735,506. Patented August 4, 1903.

UNITED STATES PATENT OFFICE.

JUDSON NOELL HATCHER, OF MOKANE, MISSOURI.

PLOW.

SPECIFICATION forming part of Letters Patent No. 735,506, dated August 4, 1903.

Application filed October 18, 1902. Serial No. 127,800. (No model.)

*To all whom it may concern:*

Be it known that I, JUDSON NOELL HATCHER, a citizen of the United States, and a resident of Mokane, in the county of Callaway and State of Missouri, have invented a new and Improved Plow, of which the following is a full, clear, and exact description.

This invention relates to improvements in plows, the object being to provide a plow that may be readily changed to form either a sulky or walking plow, as may be desired, and, further, to provide, in connection with the plow, a soil cutting or turning disk or moldboard so attached that it may be swung to operate on either side of the plow.

I will describe a plow embodying my invention and then point out the novel features in the appended claims.

Reference is to be had to the accompanying drawings, forming a part of this specification, in which similar characters of reference indicate corresponding parts in all the figures.

Figure 1 is a perspective view of a plow embodying my invention. Fig. 2 is a section on the line $x\,x$ of Fig. 1. Fig. 3 is a detail section on the line $y\,y$ of Fig. 1, and Fig. 4 is a side elevation showing the invention as a walking-plow.

The sulky portion of the plow comprises axle members 1 2, on which wheels 3 4 are mounted. The axle members 1 and 2 are adjustable vertically on a frame or yoke 5. As here shown, the said axle members have upwardly-extended portions 6, which engage against the outer side of the side members of the frame or yoke 5, and attached to these axle members and to the upright portions are loops 7, through which said side members of the frame or yoke pass. From the upward projection of the axle member 1 a link 8 extends to a connection with a crank 9 on a rock-shaft 10, which has bearings in lugs on the frame or yoke 5, and on the opposite end of this rock-shaft 10 is a crank 11, from which a link 10 extends to a pivotal connection with the upright portion of the axle 2. These cranks 9 and 11 extend in opposite directions, and therefore when the rock-shaft 10 is operated one of the wheels will be lowered while the other is raised, thus adapting the device to side-hill work.

As a means for rocking the rock-shaft I employ a lever 13, which is connected to said rock-shaft and carries a dog 14 for engaging with the segment-rack 15. The plow-beam 16 has swinging connection with a bail 17, and the said bail has pivotal connection with the side members of the frame or yoke 5. An angle-lever 18 has a swinging connection with said bail 17, and from this angle-lever 18 links 19 extend upward and have pivotal connection with the rear end of the tongue or pole 20. At the forward end of the angle-lever 18 is pivoted a link 21, the said link 21 at its forward end being connected to an arm 22, extended downward from a short shaft 23, and connected to this short shaft 23 is an operating-lever 24, carrying a dog 25 for engaging with a segment-rack 26. The angle-lever 18 is provided with a series of holes, so that the links may be adjusted therein. It is obvious that by this construction and by operating the lever 24 the plow may be raised or lowered with relation to the sulky. The forward end of the beam 16 has swinging connection with the pole or tongue 20. As here shown, this connection consists of two members 27 28, the member 27 being connected to the plow-beam and the member 28 connected to an eye on the pole or tongue. One of the members, here shown as the member 28, is provided with a longitudinal slot, through which a bolt from the member 27 passes, and on this bolt is a set-nut 29. By this arrangement the connection may be lengthened or shortened, as desired, to adjust the plow-beam relatively to the tongue or pole.

The plow-point 30 is supported by a hanger 31, and attached to the plow-beam and extended rearward from the point are two landsides 32 33, the rear ends of these landsides being connected to the heel 34 of the plow-beam. The lower edges of these landsides are turned outward or flanged, as indicated at 35. Forward of the plow-point is a rotary colter 36. This rotary colter consists of a disk having bearings in arms 37, which are mounted to swing on a clip 38, attached to the plow-beam. The swinging movement of the arms 37 is limited by means of a pin 39, attached to the clip 38 and extended into a slot formed in the socket portion of the arms. Rearward of the plow-point is a cutting-disk or moldboard 40. This cutting-disk or moldboard is concave, and it is designed to swing to either side of the plow. As here shown, it is connected to a longitudinally-curved bar 41, the forward end of said bar being mounted to swing on a stud 42, while the rear end is mounted to swing on a stud 43. The stud 42 is attached to and is adjustable vertically on the hanger 31, while the stud 43 is attached to and is vertically adjustable on the heel portion of the plow-beam.

Attached to the moldboard 40 is a stud or shaft 44, which is adjustable in a slot 45, formed in the bar 41. This stud turns in said slot, and by providing the slot the moldboard may be adjusted forward or rearward, as desired. By the longitudinal curve of the bar 41 the moldboard is supported at an acute angle with relation to the plow-point or to the landsides, so as to throw the plowed dirt outward.

In Fig. 4 the plow is disconnected from the sulky and handles are applied.

The moldboard is designed to be adjusted and held for any desired depth of cut. For this purpose I employ a hook 46, attached to the plow-beam and engaging with an eye 47 on the rear end of the bar 41. This hook, as shown in Fig. 3, consists of sections having screw-thread connections.

Having thus described my invention, I claim as new and desire to secure by Letters Patent—

1. The combination with a plow, of a rotary moldboard mounted to swing to opposite sides of the plow, substantially as specified.

2. The combination with a plow, of a rotary moldboard mounted to swing to opposite sides of the plow and standing at an acute angle with relation to the plow-point.

3. The combination with a plow, of a concave rotary moldboard, and a longitudinally-curved bar having swinging connection with the plow and to which the moldboard is adjustably attached.

4. The combination with a plow, of two landsides extended rearward from the plow-point, and a rotating moldboard mounted to swing to opposite sides of the landsides.

5. In a plow, a plow-beam, a plow-point connected to the beam, two landsides extended rearward from the point, a rotary moldboard mounted to swing to opposite sides of the landsides, a rotary colter forward of the point, and swinging arms supporting said colter.

6. The combination with a plow, of a rotary moldboard mounted to swing to opposite sides of the plow, and means for adjusting the depths-cut of the moldboard, substantially as specified.

7. The combination with a plow, of a rotary moldboard mounted to swing to opposite sides of the plow, and a sectional hook for supporting the moldboard, substantially as specified.

In testimony whereof I have signed my name to this specification in the presence of two subscribing witnesses.

JUDSON NOELL HATCHER.

Witnesses:
JAS. T. FERGUSON,
WILLIAM A. MURPHY.